US012699584B2

(12) United States Patent
Liu et al.

(10) Patent No.: US 12,699,584 B2
(45) Date of Patent: Aug. 4, 2026

(54) LOW OVERHEAD OBSERVABILITY IN CLOUD NATIVE ENVIRONMENTS

(71) Applicant: International Business Machines Corporation, Armonk, NY (US)

(72) Inventors: Ming Ran Liu, Beijing (CN); Naijie Li, Beijing (CN); Bao Zhang, Beijing (CN); Yuan Zhai, Beijing (CN); Xiao Ling Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 18/237,064

(22) Filed: Aug. 23, 2023

(65) Prior Publication Data

US 2025/0068446 A1 Feb. 27, 2025

(51) Int. Cl.
G06F 9/455 (2018.01)

(52) U.S. Cl.
CPC .. G06F 9/45558 (2013.01); G06F 2009/4557 (2013.01); G06F 2009/45583 (2013.01)

(58) Field of Classification Search
CPC .............. G06F 2009/4557; G06F 2009/45583
See application file for complete search history.

(56) References Cited

U.S. PATENT DOCUMENTS

| | | | |
|---|---|---|---|
| 11,018,959 B1 | 5/2021 | Neil | |
| 11,188,345 B2 | 11/2021 | Chen | |
| 2021/0208869 A1 * | 7/2021 | Nachimuthu | G06F 8/656 |
| 2022/0103536 A1 * | 3/2022 | Kida | H04L 63/0485 |
| 2022/0172037 A1 * | 6/2022 | Kang | G06N 3/0442 |
| 2022/0334906 A1 * | 10/2022 | Patil | G06F 11/3438 |
| 2022/0417117 A1 | 12/2022 | Tayeb et al. | |
| 2023/0118838 A1 | 4/2023 | Hulick, Jr. | |
| 2024/0073284 A1 * | 2/2024 | Parla | H04L 67/02 |

OTHER PUBLICATIONS

Bahl, Victor, "High performance container networking", https://www.microsoft.com/en-us/research/blog/high-performance-container-networking/, Published Feb. 26, 2019, 5 pages.

* cited by examiner

*Primary Examiner* — Prasith Thammavong
(74) *Attorney, Agent, or Firm* — CHIP LAW GROUP

(57) ABSTRACT

Mechanisms are provided for collecting telemetry data from an observability tool of a container executing on a host computing system. The mechanisms configure a shared memory to implement a telemetry data buffer. The telemetry data buffer is shared by observability tool instances of a plurality of containers on one or more host computing systems. Observability tool instance(s) collect telemetry data from a corresponding container in the plurality of containers. The collected telemetry data is written to a record in the telemetry data buffer. A backend computing system accesses the records in the telemetry data buffer to apply analytics to the telemetry data.

18 Claims, 11 Drawing Sheets

LOW OVERHEAD OBSERVABILITY IN CLOUD NATIVE ENVIRONMENTS

BACKGROUND

The present application relates generally to an improved data processing apparatus and method and more specifically to an improved computing tool and improved computing tool operations/functionality for providing low overhead observability in cloud native environments.

Recent trends in the building, deployment, and managing of applications is to use a software approach referred to as "cloud native". By building, deploying, and managing applications using cloud native technologies, providers are able to build and run scalable, resilient, and flexible applications in dynamic cloud computing environments. Often, such cloud native technologies involve the use of microservices in the cloud native environment. Microservices refers to a software architecture in which applications are combinations of small, independent services that communicate over well-defined application programming interfaces (APIs) such that the application as a whole is a combination of a plurality of smaller independent services that together provide the functionality of the application as a whole. Each of the individual services focuses on a single functionality and is isolated from the other services, thereby making the individual services more resilient and scalable. For example, there may separate microservices for payment processing, accounting, payroll, shipping, searching a website, database management, etc. These smaller independent services, or microservices, may be owned by different organizations, teams within organizations, or the like.

When building applications in a cloud native environment and utilizing microservices in the building of such applications, it is important to be able to perform distributed tracing and monitoring of the microservices to achieve observability, where observability refers to the ability to measure how well a software system's internal states can be inferred from knowledge of its external outputs. One tool that has been developed for providing these capabilities is referred to as OpenTelemetry. OpenTelemetry, a Cloud Native Computing Foundation (CNCF) project, is an open-source observability framework that has a set of tools, APIs, and software development kits (SDKs) that enable information technology teams to collect, analyze, and export telemetry data in order to better understand application performance and behavior.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for collecting telemetry data from an observability tool of a container executing on a host computing system. The method comprises configuring a shared memory to implement a telemetry data buffer. The telemetry data buffer is shared by observability tool instances of a plurality of containers on one or more host computing systems. The method further comprises collecting, by at least one observability tool instance, telemetry data from a corresponding container in the plurality of containers. The method also comprises writing the collected telemetry data to a record in the telemetry data buffer. In addition, the method comprises accessing, by a backend computing system, the records in the telemetry data buffer to apply analytics to the telemetry data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
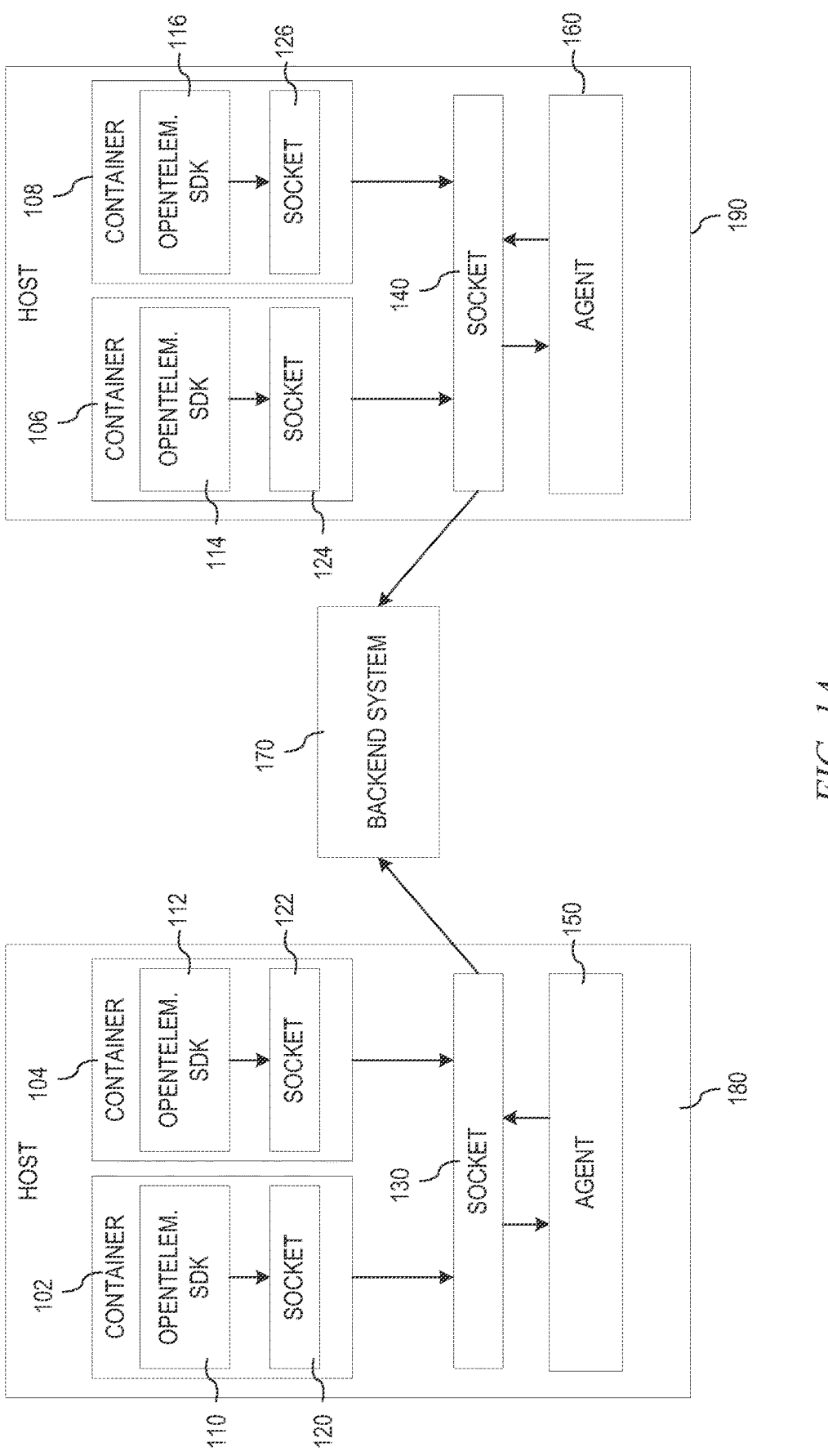
FIG. 1A illustrates an example block diagram of a socket based communication using an Agent based mechanism for communication of telemetry data from an observability tool.

The illustrative embodiments provide an improved computing tool and improved computing tool operations/functionality that are specifically directed to solving the issue of communication overhead between applications and observability tools. As noted above, OpenTelemetry is one tool that can provide capabilities for observability. However, Open-Telemetry, and tools like it, inevitably introduce additional overhead that may have negative impact on total costs of the application solution and may further negatively impact user experiences. While some tuning practices may be used to attempt to reduce this overhead with regard to processing thread contention, block wait, and the like, communication overhead introduced by the underlying layers, e.g., the operating system and hardware layers, still cannot be easily reduced.

It should be appreciated that while the illustrative embodiments will be described herein with reference to the Open-Telemetry tool as an example observability tool with which the mechanisms of the illustrative embodiments are utilized, the illustrative embodiments are not limited to such. To the contrary, the illustrative embodiments may be implemented and operate with any currently known or later developed observability tool for cloud native environments without departing from the spirit and scope of the present invention.

Using OpenTelemetry as an example, some of the illustrative embodiments provide a transparent mechanism to optimize performance of the observability tool by providing a shared memory at each host system or node and an Agent method to transfer the telemetry data, i.e., block of log data based on a predefined protocol, to a backend system and analytics tools, while in other illustrative embodiments remote direct memory access (RDMA) mechanisms are provided to transfer telemetry data from containers executed on host systems to a shared memory at the backend system. The illustrative embodiments introduce a telemetry data buffer which is a shared memory managed across different containers. Based on the telemetry data buffer, or shared memory, communications are modified from a socket stack based communication methodology to a communication methodology based on the shared memory, i.e., the telemetry data buffer. In some illustrative embodiments, this communication methodology is implemented via telemetry data buffers on each host or node, while in other illustrative embodiments this communication methodology is implemented via RDMA and a shared memory at the backend system or node.

In the case of the RDMA based methodology, the illustrative embodiments implement the control flow engine to manage the send and receive operations with regard to telemetry data, with the telemetry data buffer supporting an asynchronous sending and receiving of telemetry data so that the application does not need to wait for the completion of a telemetry data transmission. In the case of the shared memory, the backend observation tool is modified to send telemetry data directedly to the shared memory and Agent methods retrieve the data from the shared memory and transfer the retrieved data to a backend system and analytics tools.

As a result of the improved computing tool and improved computing tool operations/functionality of the illustrative embodiments, employing the telemetry data buffer, RDMA, and flow control engine, the communication overhead between containers and the backend observation tool, e.g., OpenTelemetry, can be greatly reduced. As the elements of the illustrative embodiments may be integrated into the software development kit (SDK) of the observability tool, the illustrative embodiments are transparent to the application.

Using an illustrative embodiment in which the observability tool is the OpenTelemetry tool, it should be appreciated that the OpenTelemetry tool includes Agent methods, Gateway methods, and configured backends. The Agent method is a collector instance running on the same host as the application that emits the telemetry data. The Agent method collects this telemetry data and forwards this data to a Gateway method. The Gateway method is one or more instances of collectors which receive data from multiple Agent methods. The Gateway method then sends the telemetry data to a configured backend receiver application, such as Jaeger, Zipkin, private vendor applications, or the like.

With the mechanisms of the illustrative embodiments, in which a shared memory, referred to as the telemetry data buffer, is utilized on each host computing system, or node, the telemetry data buffer stores a records queue in which logs of telemetry data are recorded by the OpenTelemetry SDK of the containers executing on each host system or node. That is, in some illustrative embodiments, the methodology employed, which is referred to as an Agent based methodology, the mechanisms of the illustrate embodiments configure the OpenTelemetry SDK of the containers to send the telemetry data collected by the OpenTelemetry SDK to the Agent method executing on the same node through the shared memory of the telemetry data buffer. Each node, or host computing system, has an Agent method, or simply Agent, which executes to collect the records and send them to a center node, or backend computing system. The Agent reads the telemetry data from the shared memory of the telemetry data buffer regularly and sends this data to the backend system or center node, which may comprise receivers for receiving the telemetry data and analysis tools that operate on the telemetry data to perform various analysis functions.

In other illustrative embodiments, the methodology is a Gateway based methodology, where applications in containers with OpenTelemetry SDK send the telemetry data to the backend system and analysis tools, or center node, directly through remote direct memory access (RDMA) send/receive operations. The backend system or node is updated with a control flow engine to prepare the receive work requests of RDMA and check the status of the receive queue regularly. The backend system or node reads the telemetry data from the telemetry data buffer and then performs further operations based on the telemetry data, e.g., executes analytics tools or the like on the telemetry data.

In both the Agent based methodology and the Gateway based methodology, if sending the data to the shared memory of the telemetry data buffer fails, the OpenTelemetry SDK of the illustrative embodiments, implemented in the containers, is configured to revert back to a traditional socket based method of communication to send the telemetry data, as discussed hereafter.

Because the illustrative embodiments implement a telemetry data buffer, Agents, and/or RDMA mechanisms, depending on the particular illustrative embodiment, to handle the communication of telemetry data from containers executing on host systems, or nodes, to the backend system and analytics tools, the overhead of socket based communication is avoided. This improves the performance of the observability tool by reducing the overhead of the socket stack, allowing for time critical scenarios to be handled with case.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The illustrative embodiments provide an improved computing tool and improved computing tool operations/functionality that is specifically directed to improving the performance of observability tools, such as OpenTelemetry and the like, by reducing the overhead of communications of telemetry data between the containers executing on host systems, or nodes, and the backend computing system comprising the analytics tools for analyzing the telemetry data. The illustrative embodiments specifically provide improved computing tools that avoid the latency and performance degradation due to the overhead of processing telemetry data via the socket stack of socket based communications. As noted above, for the following description of examples and illustrative embodiments, the OpenTelemetry observability tool will be used as a non-limiting example to illustrate the improvements provided by the illustrative embodiments. Thus, a familiarity with OpenTelemetry is assumed, and specifically with regard to the OpenTelemetry software development kit (SDK) and the use of Agent and Gateway methods.

Figure 1B:
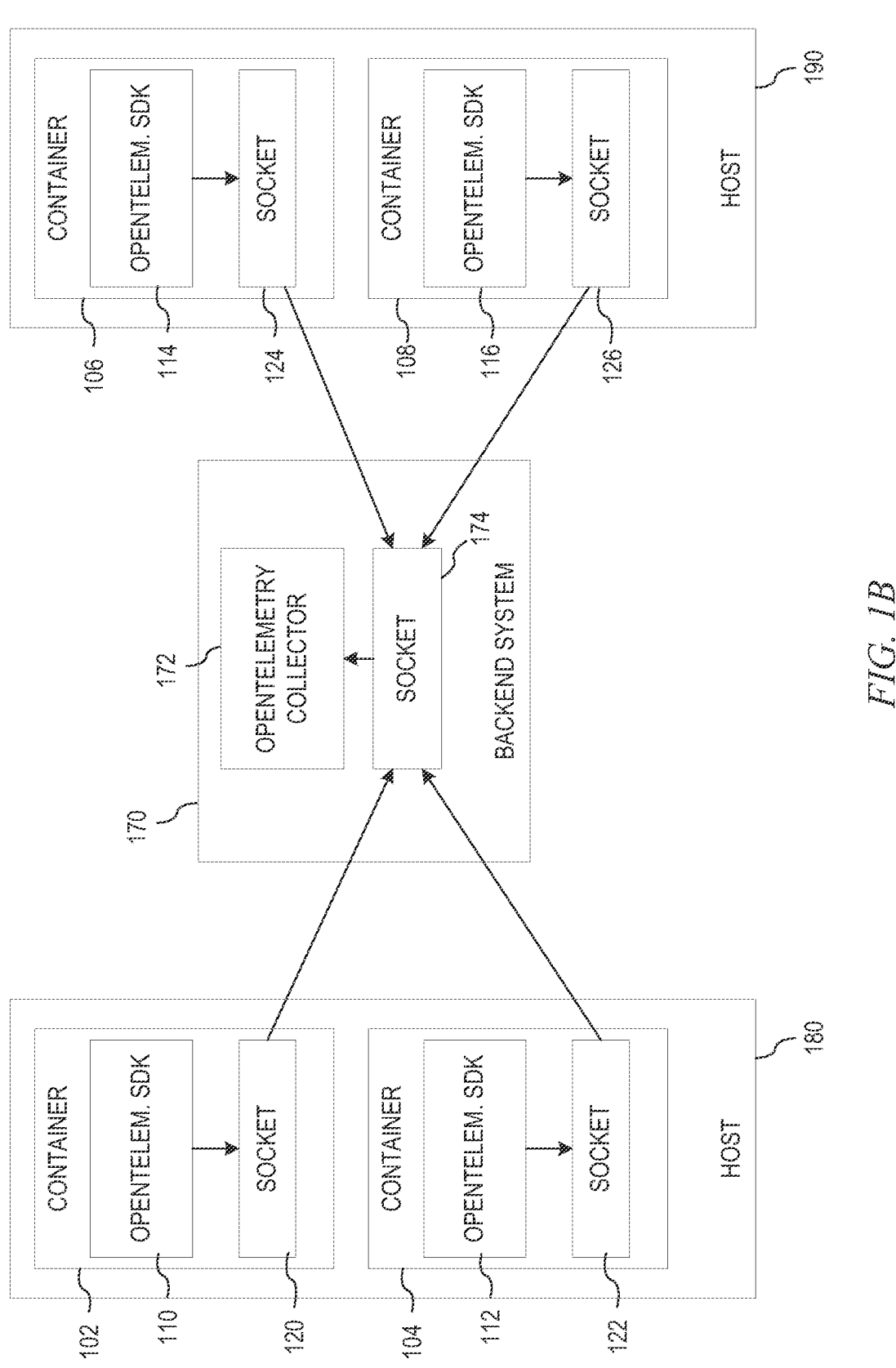
FIG. 1B illustrates an example block diagram of a socket based communication using a Gateway based mechanism for communication of telemetry data from an observability tool.

FIGS. 1A and 1B are example diagrams showing Agent and Gateway based architectures for implementing an Open-Telemetry solution using socket-based communications. FIG. 1A illustrates an example block diagram of a socket based communication using an Agent based mechanism for communication of telemetry data from an observability tool. As shown in FIG. 1A, in this architecture, each container 102-108 implements a separate instance 110-116 of the OpenTelemety software development kit (SDK) that communicates telemetry data of the corresponding container 102-108 to a corresponding Agent 150, 160 executing on the host system 180, 190, also referred to herein as a "node". The communication of the telemetry data in this architecture requires socket based communications between the containers 102-108 and the Agent 150, 160, and from the Agent 150, 160 to the backend system, or center node, 170.

That is, the Agent 150, 160 requests telemetry data from the OpenTelemetry SDKs 110-112 and 114-116, respectively, which then performs socket based communications to transmit the telemetry data from the OpenTelemetry SDKs 110-112, and 114-116, through the corresponding sockets 120-122 to socket 130 and sockets 124-126 to socket 140, to provide the telemetry data to the Agent 150, 160. The Agent 150, 160 then transmits the telemetry data to the backend system 170 via the socket 130, 140. Each of the sockets 120-140 has a corresponding protocol stack, or socket stack, which requires specific processing of the data through layers of the protocol stack. This adds overhead to the communication between the containers 102-108 and the Agents 150, 160, as well as the Agents 150, 160 and the backend system 170.

FIG. 1A illustrate an Agent based architecture for implementing an OpenTelemetry observability tool, however OpenTelemetry also supports the use of Gateway methods. FIG. 1B illustrates an example block diagram of a socket based communication using a Gateway based mechanism for communication of telemetry data from an observability tool. Similar elements as in FIG. 1A are shown with similar reference numerals.

As shown in FIG. 1B, the primary difference between the Agent based architecture as shown in FIG. 1A and the Gateway based architecture shown in FIG. 1B is that the OpenTelemetry SDKs 110-116 of the containers 102-108 communicate via sockets 120-126 with an OpenTelemetry collector 172 in the backend system 170 via socket 174 without having to go through an Agent. However, the overhead of socket based communications is still present in this architecture.

To address the overhead of the socket based communications, the illustrative embodiments provide improved computing tool mechanisms that implement a shared memory, referred to herein as the telemetry data buffer, through which telemetry data is shared by the host systems, or nodes, and a backend system, or center node. In some illustrative embodiments, the Agent operates to retrieve the telemetry data from a telemetry data buffer on the host system and send it to the backend system via a RDMA operation, socket communication, or the like. In other illustrative embodiments, remote direct memory access (RDMA) operations are performed by the OpenTelemetry SDKs in the containers on the host systems to communicate the telemetry data from the OpenTelemetry SDKs to a telemetry data buffer on the backend system. A flow control engine operates to manage a receive queue and receive requests. Thus, telemetry data may be communicated from the Open Telemetry SDKs, or other observability tool, of the various containers, to the backend system or center node for further analysis by analytics tools, while avoiding the overhead associated with socket based communications.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides communication of telemetry data from observability tools executing in containers on host systems, to a backend system for application of analytics to the telemetry data, while avoiding overhead of socket communications. The improved computing tool implements mechanisms and functionality, such as the telemetry data buffer, RDMA libraries, and flow control engine, which cannot be practically performed by human beings either outside of, or with the assistance of, a technical environment, such as a mental process or the like. The improved computing tool provides a practical application of the methodology at least in that the improved computing tool is able to communicate telemetry data from observability tools executing in containers on host systems, to a backend system without requiring socket communications.

Figure 2:
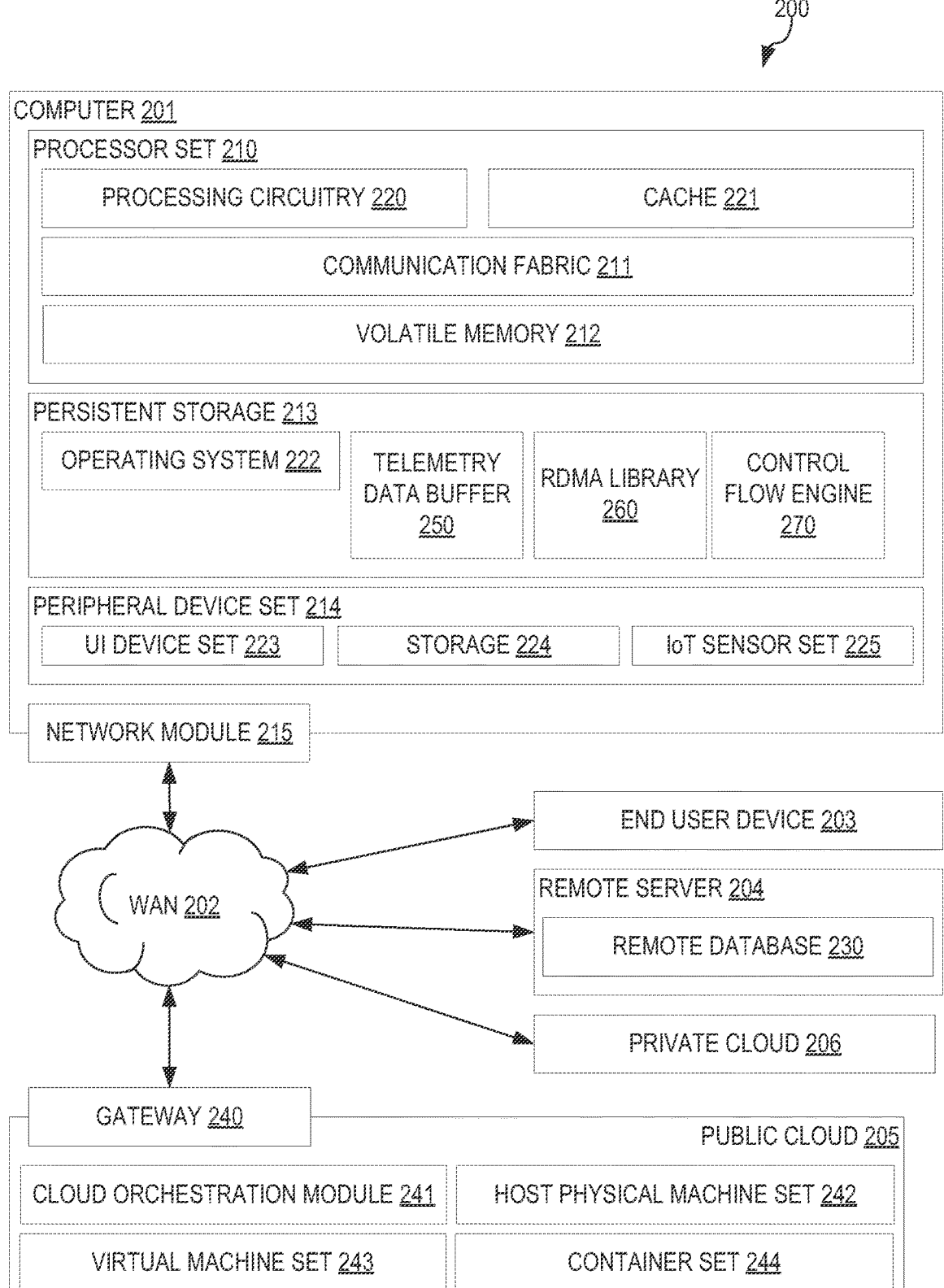
FIG. 2 is an example diagram of a distributed data processing system environment in which aspects of the illustrative embodiments may be implemented and at least some of the computer code involved in performing the inventive methods may be executed.

FIG. 2 is an example diagram of a distributed data processing system environment in which aspects of the illustrative embodiments may be implemented and at least some of the computer code involved in performing the inventive methods may be executed. That is, computing environment 200 contains an example of an environment for the execution of at least some of the computer code involved in performing the inventive methods, such as the telemetry data buffer 250, RDMA library 260, and control flow engine 270 of one or more of the illustrative embodiments. In some situations, where the computer 201 operates as a host system, or node, the computer 201 may further implement and execute containers with observability tools that communicate telemetry data for the processes executed by the container, Agents, and/or Gateway or collector (not shown). In addition to the telemetry data buffer 250, RDMA library 260, and control flow engine 270, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222, telemetry data buffer 250, RDMA library 260, and control flow engine 270, as identified above), peripheral device set 214 (including user interface (UI), device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/ or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip."

In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in logic for implementing the telemetry data buffer 250, RDMA library 260, and control flow engine 270, such as in persistent storage 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface type operating systems that employ a kernel. The code included in logic for implementing the telemetry data buffer 250, RDMA library 260, and control flow engine 270, typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network nodule 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

As shown in FIG. 2, in accordance with the various illustrative embodiments, one or more of the computing devices, e.g., computer 201 or remote server 204, may be specifically configured to implement one or more of a telemetry data buffer 250, RDMA library 260, and control flow engine 270, along with observability tool software development kit instances, and the like. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 201 or remote server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates communication of telemetry data from observability tools executing in containers on host systems, to a backend system for application of analytics to the telemetry data, while avoiding overhead of socket communications.

Figure 3:
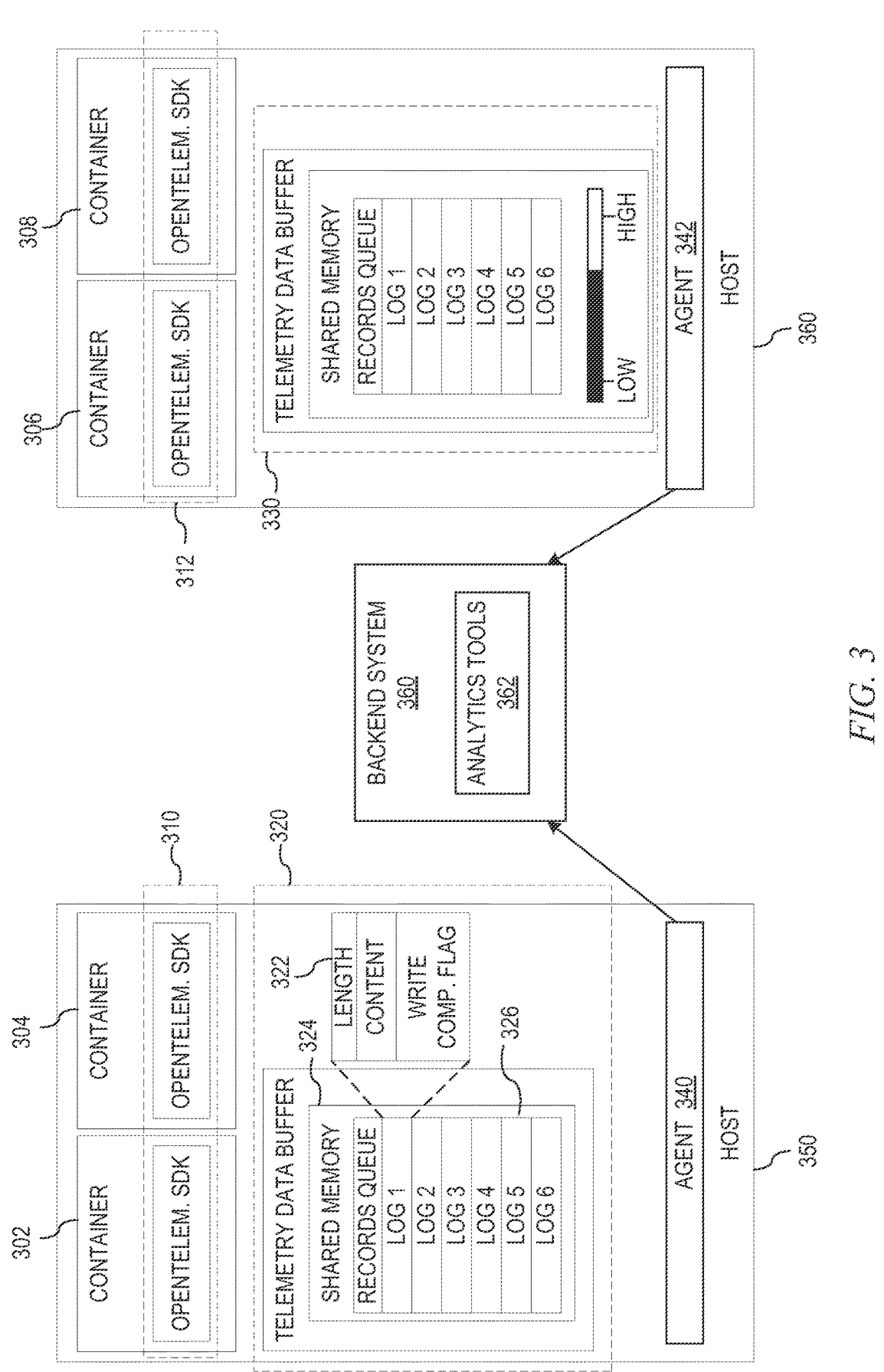
FIG. 3 is an example block diagram of an Agent based mechanism for communication of telemetry data using a telemetry data buffer in accordance with one illustrative embodiment.

FIG. 3 is an example block diagram of an Agent based mechanism for communication of telemetry data using a telemetry data buffer in accordance with one illustrative embodiment. As shown in FIG. 3, similar to the example in FIG. 1A, each host system 350, 360 executes containers 302-304 and 306-308, respectively, which have corresponding observability tools 310, 312, such as OpenTelemetry SDK. However, in the Agent based mechanisms of the illustrate embodiments, the observability tools 310 write the telemetry data as logs 326 in the shared memory 324 of the telemetry data buffer 320 which is shared by the containers 302, 304 of the host system 350. Similarly, the observability tools 312 of the containers 306, 308 write the telemetry data to the shared memory of the telemetry data buffer 330 on host system 360. The telemetry data buffers 320, 330 thus, are shared memory managed across the different containers 302-304 and 306-308 of the respective host system 350, 360. Based on the telemetry data buffer 320, 330 communications are modified from a socket stack based communication methodology to a communication methodology based on the shared memory, i.e., the telemetry data buffers 320, 330.

An Agent 340 executing on the host system 350 retrieves the telemetry data, or logs 326, from the shared memory 324 of the telemetry data buffer 320 and communicates the retrieved logs 326 to the backend system, or central node, 360 for application of appropriate analytics tools 362. Similarly, Agent 342 executing on host system 360 retrieves telemetry data, or logs, form the telemetry data buffer 330 and communicates the retrieved logs to the backend system 360.

In writing the telemetry data to the shared memory 324 of the telemetry data buffer 320, the data structures for the applications of the containers 302-304 are collected by the observability tool instances 310, e.g., OpenTelemetry SDK, and stored as records or log entries 326 in the records queue of the shared memory 324. Each of these records, or logs 326, includes a length, the record/log content, and a flag that indicates that the writing of the record/log has been completed, as shown in 322.

Figure 4:
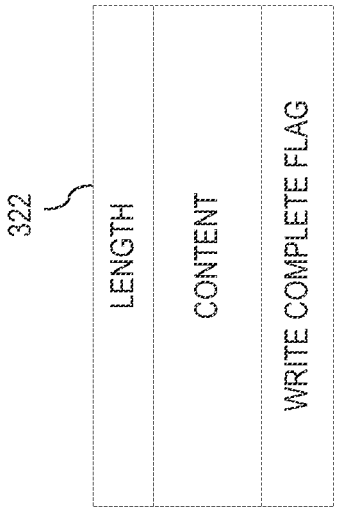
FIG. 4 is an example diagram of a telemetry data buffer and buffer pointers in accordance with one illustrative embodiment.
Figure 4:
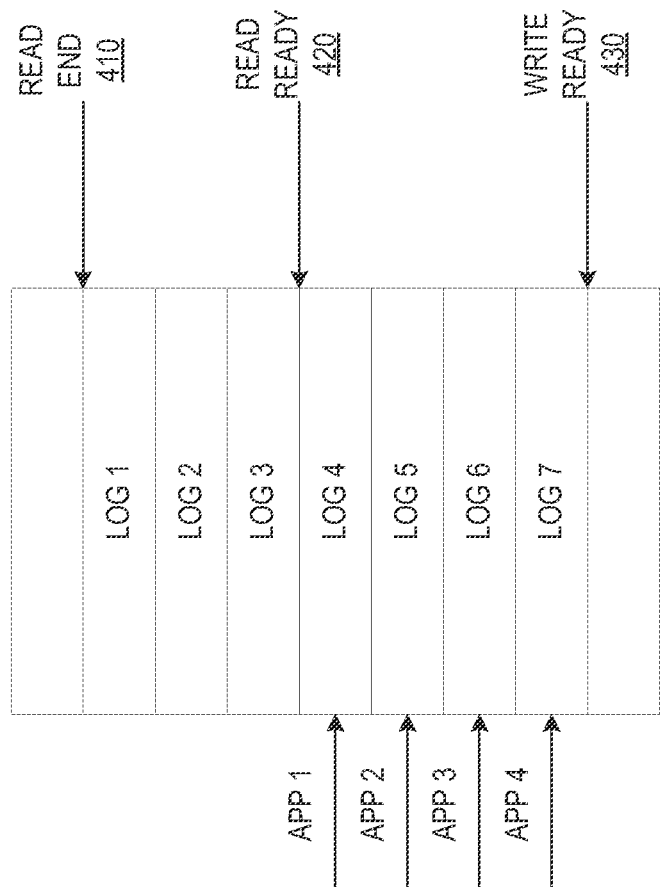

To manage the records queue of the telemetry data buffer 320, pointers are utilized to manage reads/writes. FIG. 4 is an example diagram of a telemetry data buffer and buffer pointers in accordance with one illustrative embodiment. As shown in FIG. 4, the telemetry data buffer 320 uses a Read End pointer 410 to identify the last record/log that was read. A Read Ready pointer 420 identifies the address where, before this address, the telemetry data has been written successfully. The telemetry data between the Read Ready pointer 420 and the Read End pointer 410 can be read by the Agent. A Write Ready pointer 430 identifies the address of the next entry where telemetry data may be written in the telemetry data buffer 320. When a container writes telemetry data to the telemetry data buffer 320, the container moves the Write Ready pointer 430 first, and then moves the Read Ready pointer 420 after finishing writing the telemetry data, which minimizes the time frame for a container having a lock on the telemetry data buffer 320.

When an observability tool, e.g., OpenTelemetry SDK, 310 associated with an application, e.g., an application of a container 302, wishes to communicate collected telemetry data, the observability tool writes a record to the shared memory through the following process. Initially, the observability tool attempts to get the lock on the shared memory of the telemetry data buffer 320. If the obtaining of the lock is successful, then the write ready pointer 430 address is obtained, the telemetry data is written to the telemetry data buffer 320, and the write ready pointer 430 is moved to a location after the telemetry data that was written. The Write complete flag of the entry in the telemetry data buffer 320 is cleared as well as the Ready pointer 420. The entry in the telemetry data buffer 320 is unlocked and the length and content of the record/log 322 at that entry is filled with the telemetry data to be written to the telemetry data buffer 320. The write complete flag of the record/log 322 is then set and a determination is made as to whether the Read Ready pointer 420 points to the current record/log 322 in the telemetry data buffer 320, i.e., the record/log that was just written to the telemetry data buffer 320.

If the Read Ready pointer 420 points to the current record/log 322, then the Read Ready pointer 420 is moved. That is, the mechanisms of the illustrative embodiments allow multiple containers to write telemetry data to the telemetry data buffer 320. For the write process of a container, the Read Ready pointer 420 points to the current record/log 322, meaning that before the Read Ready pointer 420, all telemetry data has been written successfully. If the Read Ready pointer 420 is not pointing to the current record/entry 322, it will only set the Write complete flag and does not do anything else. Thus, the process needs to check whether the following data has been written completely and successfully. The write complete field is checked and while the next record/log is before the Write Ready pointer 430 and the write complete flag is set, the Read Ready pointer 420 is moved to the last written complete data.

If the lock on the telemetry data buffer is not able to successfully obtained, the operation reverts to using socket interfaces to send the record/log 322 to the Agent 340. Similar writing of records/logs to the telemetry data buffer 330 of host system 360 may be performed by the observability tools 312 of the containers 306-308 executing on host system 360.

Thus, with the mechanisms of the illustrative embodiments, in which a shared memory, or telemetry data buffer 320, is utilized on each host computing system, or node, 350, 360 the telemetry data buffer 320 stores a records queue in which records/logs 322 of telemetry data are recorded by the observability tool, e.g., OpenTelemetry SDK, of the containers 302-304, 306-308 executing on each host system or node 350, 360. The observability tools 310, 312 of the containers 302-308 are specifically configured to send the telemetry data collected by the observability tools, e.g., OpenTelemetry SDK, to the corresponding Agents 350, 360 executing on the same host system/node 350, 360 through the telemetry data buffer 320, 330.

Each Agent 340, 360 executes to collect the records and send them to a center node, or backend system 360 for application of analytics tools 362 to the telemetry data. This retrieval of records/logs 322 from the telemetry data buffer 320 by the Agent may be performed periodically in response to triggering conditions of the telemetry data buffer 320. For example, threshold values may be set for determining when to trigger Agent retrieval of records/logs from the telemetry data buffer and sending of the retrieved records/logs to the backend system 360. In one illustrative embodiment, the threshold(s) may be based on a number of records/logs in the telemetry data buffer. That is, the low threshold corresponds to too little data being written in the telemetry data buffer 320. The high threshold corresponds to too many telemetry data entries being written to the telemetry data buffer 320. The actual values of these thresholds may be set according to a desired implementation.

When triggered, the Agent 350, 360 reads records/logs of telemetry data from the shared memory of the telemetry data buffer 320 and sends this data to the backend system 360 or center node, which may comprise receivers for receiving the telemetry data and analysis tools 362 that operate on the telemetry data to perform various analysis functions. In reading the records/logs from the telemetry data buffer 320, 330 the Agent 350, 360 obtains the Read End pointer 410 of the telemetry data buffer and reads the records/logs from the telemetry data buffer until the Agent reaches the Read Ready pointer 420. The Read End pointer 410 is then moved, after the read process ends, to a last read telemetry data entry, which corresponds to the Read Ready pointer 420, and the read records/logs comprising the telemetry data are sent to the backend system or node 360.

Figure 5:
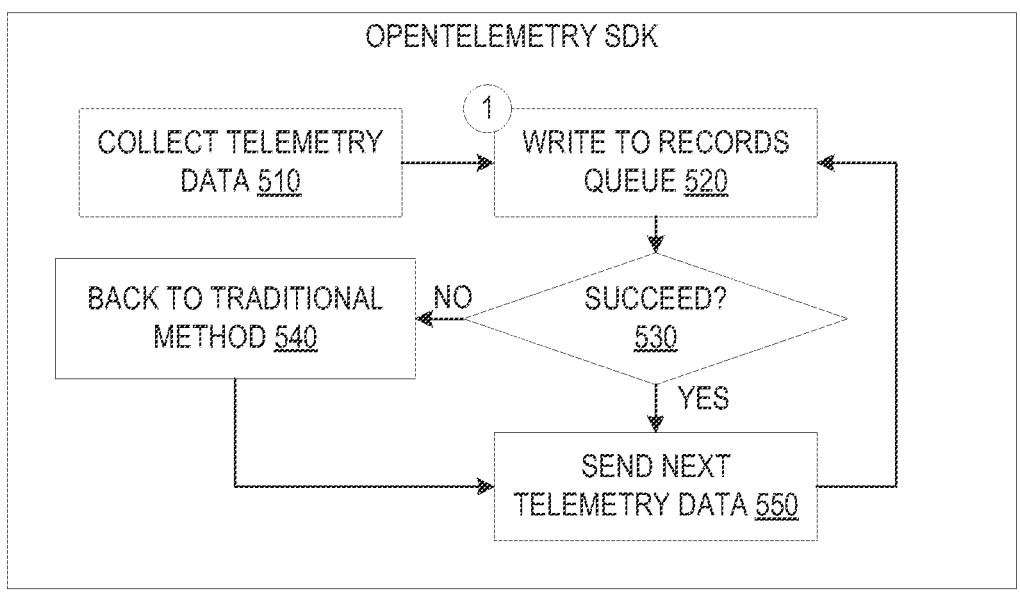
FIG. 5 is an example flowchart illustrating a workflow of the observability tool software development kit (SDK) in an Agent based mechanism in accordance with one illustrative embodiment. As shown in FIG. 5.
Figure 6:
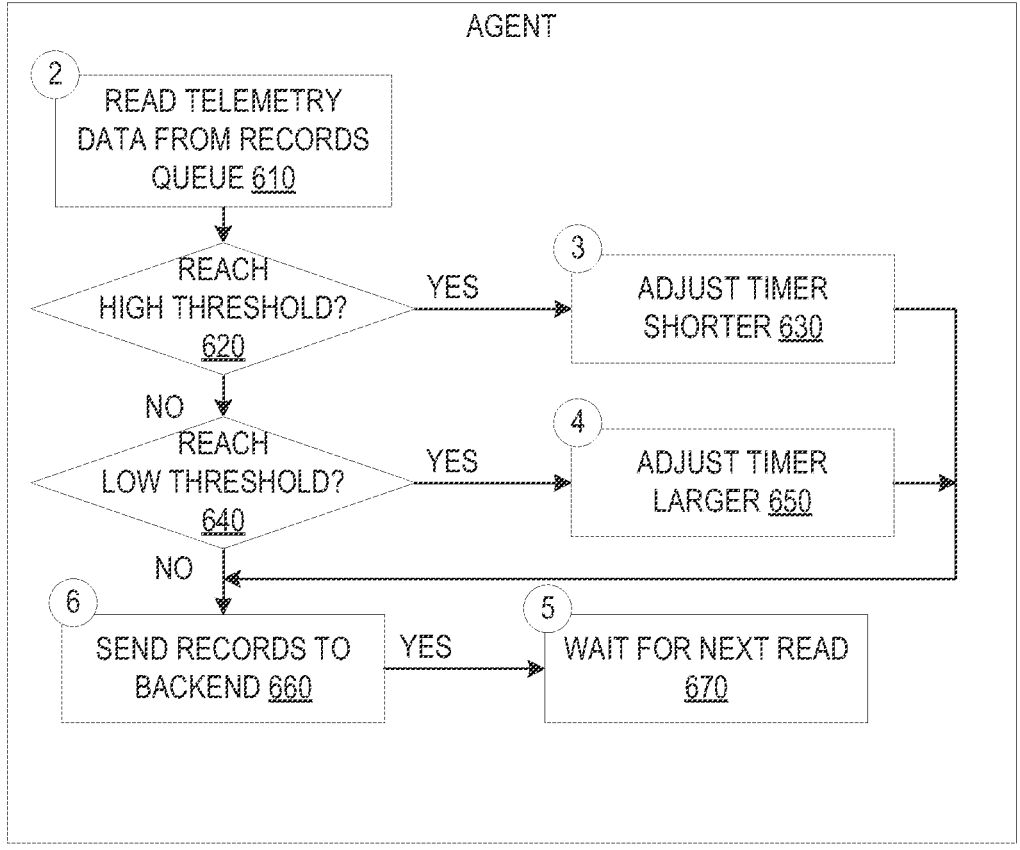
FIG. 6 is an example flowchart illustrating a workflow of an Agent in an Agent based mechanism in accordance with one illustrative embodiment.

FIGS. 5-6 present flowcharts outlining example operations of elements of the present invention with regard to one or more illustrative embodiments. It should be appreciated that the operations outlined in FIGS. 5-6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-6, and may, in some cases, make use of the results generated as a consequence of the operations set forth in FIGS. 5-7, the operations in FIGS. 5-6 themselves are specifically performed by the improved computing tool in an automated manner.

FIG. 5 is an example flowchart illustrating a workflow of the observability tool software development kit (SDK) in an Agent based mechanism in accordance with one illustrative embodiment. As shown in FIG. 5, the observability tool software development kit, which in this example embodiment is an OpenTelemetry SDK, collects telemetry data from the application(s) of the corresponding container (step 510). The collected telemetry data tries to write the telemetry data to the records queue of the telemetry data buffer (step 520). In writing the data, the OpenTelemetry SDK tries to obtain the lock on the telemetry data buffer and write the data to a record/log of the telemetry data buffer. However, obtaining the lock may not be successful. Thus, a determination is made as to whether or not the lock is successfully obtained (step 530). If not, the sending of telemetry data to the Agent is performed in a traditional socket based communication method (step 540). If the lock is successfully obtained, then the telemetry data is sent to the agent by writing the telemetry data to the next record/log entry in the telemetry data buffer (step 550). The operation then returns to step 520 to continue to write records until there are no more records to write.

FIG. 6 is an example flowchart illustrating a workflow of an Agent in an Agent based mechanism in accordance with one illustrative embodiment. As shown in FIG. 6, the operation of the Agent starts by reading the telemetry data from the records queue (step 610). A determination is made as to whether the high threshold is reached (step 620). If the high threshold is reached, then a timer is adjusted to be shorter, where this timer is used to control the frequency of execution of the read process.

If the high threshold is not reached, then a determination is the low threshold is reached (step 640). If the low threshold is reached, then the timer is adjusted to be larger (step 650). That is, in the backend system, or center node, a timer is introduced to control the frequency to read the telemetry data, where the system will check the usage of the telemetry data buffer and if the usage reaches the high threshold, which means too much telemetry data has been written to the telemetry data buffer, the timer should be adjusted to higher frequency. If the usage reaches the low threshold, which means too little telemetry data has been written to the telemetry data buffer, the timer should be adjusted to a lower frequency. After such adjustments of the timer, the system will wait for the timer to trigger a next read operation.

If the low threshold is not reached, or after the timers have been adjusted in steps 630, 650, the telemetry data records read from the records queue of the shared memory of the telemetry data buffer are sent to the backend system (step 660) and the operation then waits for the next read operation by the Agent (step 670).

Figure 7:
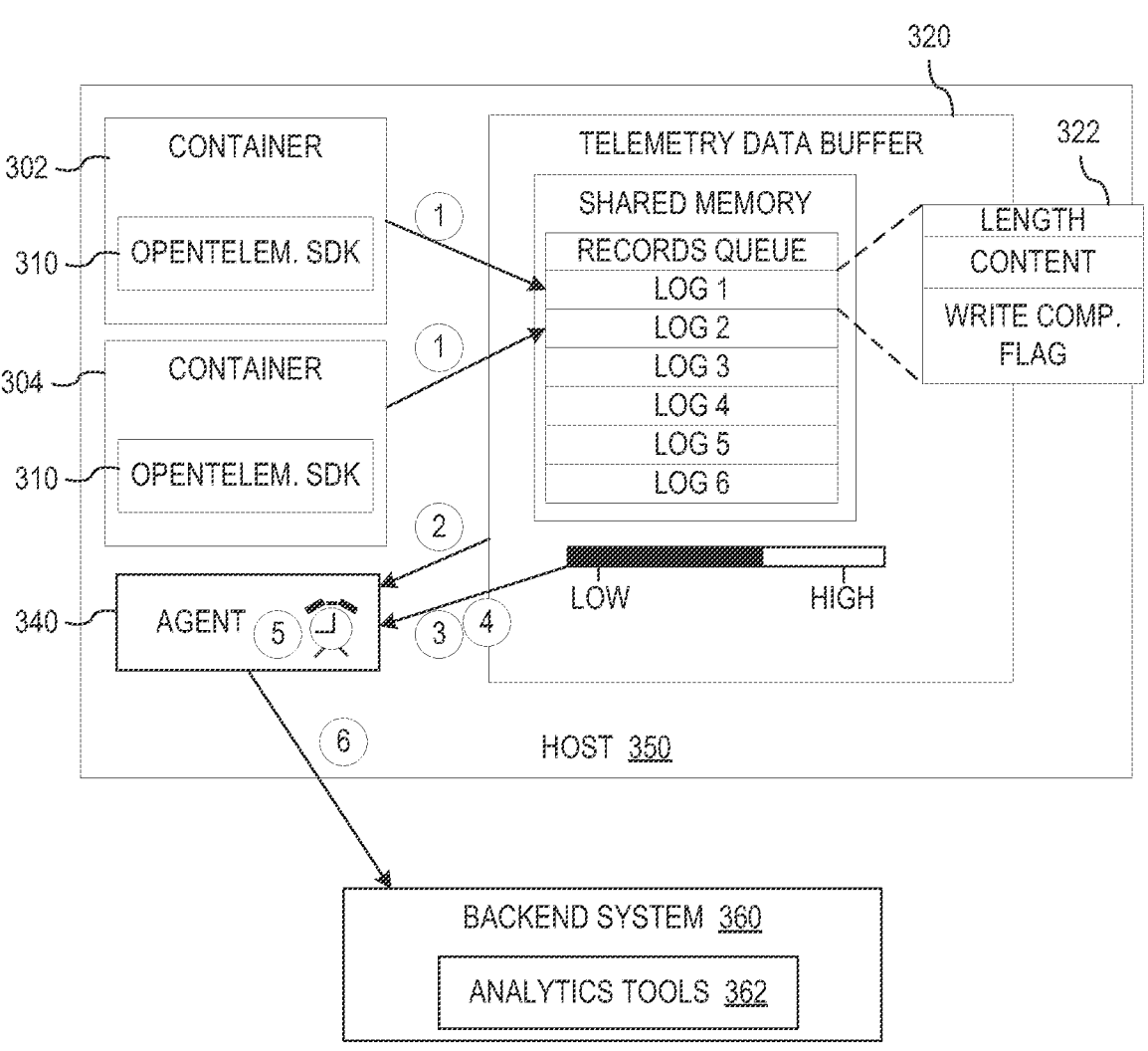
FIG. 7 is an example block diagram illustrating the operations of the workflow of FIGS. 5 and 6 with regard to elements of a host node in accordance with one illustrative embodiment.

FIG. 7 is an example block diagram illustrating the operations of the workflow of FIGS. 5 and 6 with regard to elements of a host node in accordance with one illustrative embodiment. As shown in FIG. 7, the OpenTelemetry SDKs 310 write the telemetry data to records of the records queue in the shared memory of the telemetry data buffer 320 (operation 1; operation numbers are noted in the flowcharts of FIGS. 5 and 6 for correlation purposes). The Agent 340 reads the telemetry data from the records queue (operation 2) and determinations are made as to whether the low/high thresholds are reached, with subsequent adjustment of the timer (operations 3 and 4). The Agent sends the records to the backend (operation 6) and waits for the next read by the Agent (operation 5).

Thus, the illustrative embodiments provide mechanisms to replace the socket based communication mechanisms with a shared memory implemented telemetry data buffer and corresponding logic for writing to and reading from this telemetry data buffer by the observability tools and corresponding Agent methods. As a result of the improved computing tool and improved computing tool operations/functionality of the illustrative embodiments, employing the telemetry data buffer and the Agents, the communication overhead between the observability tools in the containers and the backend system can be greatly reduced. The illustrative embodiments eliminate the communication overhead associated with socket based communications.

In other illustrative embodiments, the methodology is a Gateway based methodology, where applications in containers with an observability tool, e.g., OpenTelemetry SDK, send the telemetry data to the backend system and analysis tools, or center node, directly through remote direct memory access (RDMA) send/receive operations. The backend system or node is updated with a control flow engine to prepare the receive work requests of RDMA and check the status of the receive queue regularly. The backend system or node reads the telemetry data from the telemetry data buffer and then performs further operations based on the telemetry data, e.g., executes analytics tools or the like on the telemetry data.

Figure 8:
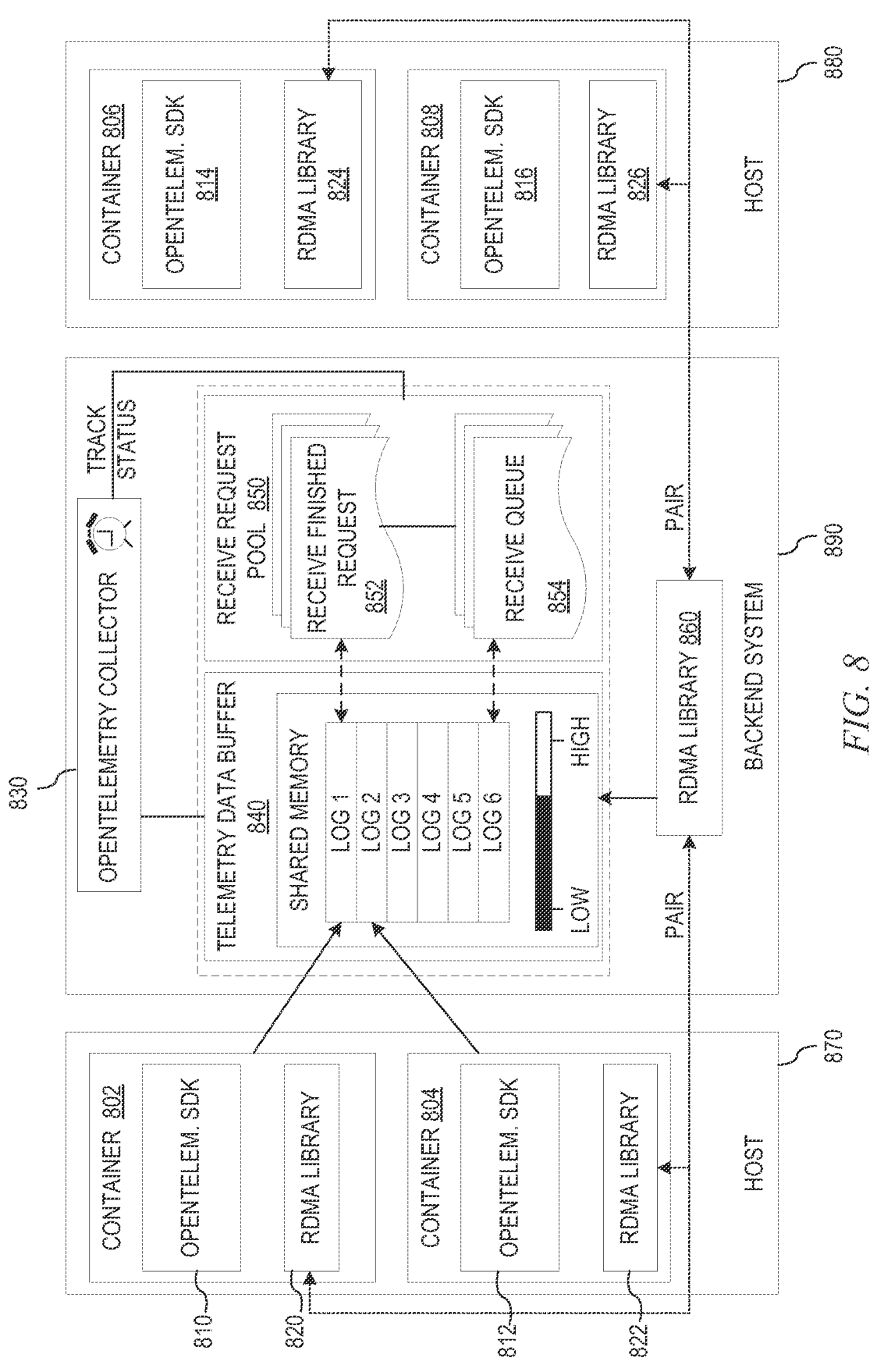
FIG. 8 is an example block diagram of a Gateway based mechanism for communication of telemetry data using a telemetry data buffer and flow control engine in accordance with one illustrative embodiment.

FIG. 8 is an example block diagram of a Gateway based mechanism for communication of telemetry data using a telemetry data buffer and flow control engine in accordance with one illustrative embodiment. As shown in FIG. 8, rather than the telemetry data buffer being in each of the host systems, the Gateway based method uses a telemetry data buffer 840 with shared memory that is present on the backend system 890, or central node. The containers 802-808 each have associated observability tools, e.g., OpenTelemetry SDK 810-816. In addition, each container has a remote direct memory access (RDMA) software library 820-826 which are paired with the RDMA software library 860 of the backend system 890 in order to perform RDMA operations between the host systems 870-880 and the backend system 890. The backend system 890 further includes a receive request pool 850 which operates as a control flow engine 850 to control the flow of telemetry data from the telemetry data buffer 840 to the telemetry data collector 830, e.g., OpenTelemetry collector. The receive request pool 850 comprises receive queues 854 to which receive work requests are posted in accordance with RDMA receive operations, and receive finished request data structures 852.

The RDMA software libraries 820-826 write telemetry data from their corresponding observability tools 810-826 to the records/logs of the telemetry data buffer 840 via RDMA operations. The control flow engine/receive request pool 850 manages the entries in the telemetry data buffer for reading out telemetry data to the collector 830 by having receive work requests associated with each of the pieces of telemetry data stored in the records/logs of the telemetry data buffer 840.

Thus, the observability tool instances 810-816, e.g., OpenTelemetry SDK, are modified to send the telemetry data to the backend and analysis tools directly through RDMA facilitated by the RDMA software libraries 820-826 paired with the RDMA software library 860 of the backend system 890. In so doing, the observability tool instances 810-816 create a new thread which is used for sending the telemetry data and setup the RDMA environment by creating a queue pair between the RDMA software library instance 820-826 and the RDMA software library 860 of the backend system 890. The telemetry data is sent to the backend system 890 by using an RDMA write operation ("ibv_post_send( )"). If this fails, then the socket based communication may be used (see FIG. 1B).

The backend system 890 is modified to prepare the receive work requests of RDMA and get the telemetry data through the telemetry data buffer 840 which acts as a RDMA buffer. Receive work requests are posted to the receive queue 854 and the status of the receive queue 854 is tracked (e.g., with "ibv_poll_cq( )"). The content of the records/logs in the telemetry data buffer 840 are read by the collector 830. To further illustrate how these receive work requests are used with RDMA, assume that there are two nodes A and B. If node A wants to send data to node B through RDMA, node A and node B are paired first. Node B needs to post the receive work requests to a receive queue so that other nodes can write data to node B. Each receive work request is associated with a piece of storage, which in the case of the illustrative embodiments would be the telemetry data buffer. When other nodes write data to node B, they will write the data to the pieces of storage and the states of the corresponding work request will be changed. When node B checks the states, node B will see which work request's state has changed, which means there was data written to that storage location by other nodes. After node B reads the data from that location of storage, node B can post the receive work request again so that it can receive data again.

Figure 9:
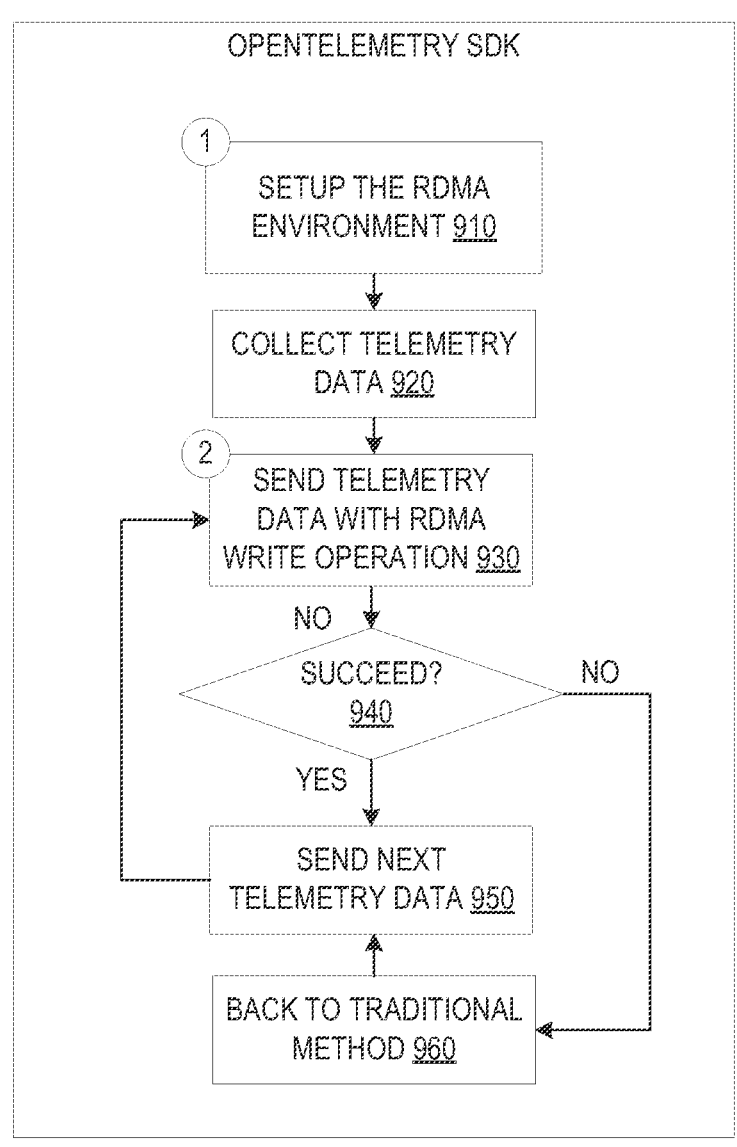
FIG. 9 is an example flowchart illustrating a workflow of the observability tool software development kit (SDK) in a Gateway based mechanism in accordance with one illustrative embodiment.

FIG. 9 is an example flowchart illustrating a workflow of the observability tool software development kit (SDK) in a Gateway based mechanism in accordance with one illustrative embodiment. As shown in FIG. 9, the operation of the modified observability tool, e.g., a modified OpenTelemetry SDK, starts by setting up the RDMA environment by creating a queue pair between the RDMA software library of the container and a backend RDMA software library (step 910). The telemetry data is then collected by the observability tool (step 920). The observability tool attempts to send the collected telemetry data directly to the telemetry data buffer of the backend system via a RDMA write operation using the RDMA queue pair (step 930). A determination is made as to whether such a RDMA write operation is successful (step 940). If so, then the operation sends the telemetry data by writing the data to the telemetry data buffer (step 950). If the operation is not successful (step 940), then the traditional socket based communication is used to send the telemetry data to the backend system. The operation returns to step 930 until no more collected telemetry data is collected. After the telemetry data is sent, the system will wait to send the next portion of telemetry data but collects data until the application terminates.

Figure 10:
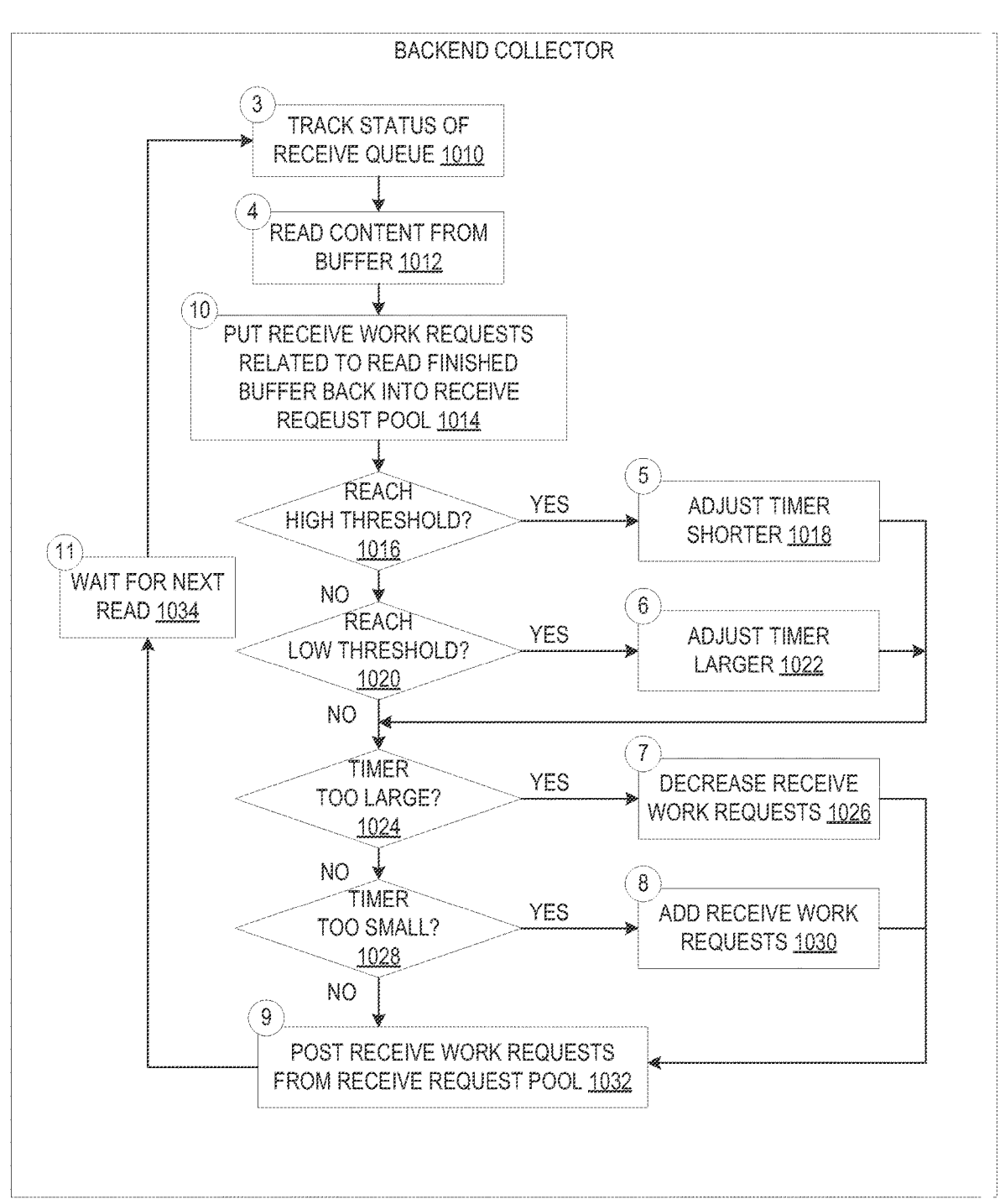
FIG. 10 is an example flowchart illustrating a workflow of a backend collector in a Gateway based mechanism in accordance with one illustrative embodiment.

FIG. 10 is an example flowchart illustrating a workflow of a backend collector in a Gateway based mechanism in accordance with one illustrative embodiment. As shown in FIG. 10, the operation of the backend collector starts by tracking the status of the receive queue (step 1010). The content of the record/log entry in the telemetry data buffer is read (step 1012) and the receive work requests related to the read telemetry data locations in the telemetry data buffer, i.e., the read finished buffer, are put back into the receive request pool (step 1014).

After reading the content from the telemetry data buffer (step 1012) and putting the receive work requests back into the receive request pool (step 1014), a determination is made as to whether a high threshold is reached (step 1016). If so, then the timer is adjusted to be shorter (step 1018). If the high threshold is not reached, a determination is made as to whether the low threshold is reached (step 1020). If so, then the timer is adjusted to be larger step (1022). Thereafter, or if the low/high thresholds are not reached, a determination is made as to whether the timer is too large (step 1024). If the timer is too large, receive work request are deleted (step 1026).

If the timer is not too large (step 1024), then a determination is made as to whether the timer is too small (step 1028). If the timer is too small, then receive work request are added (step 1030). The receive work requests are posted to the receive request pool (step 1032). Thereafter, or if the timer is not too small (step 1028), the operation waits for the next read (step 1034) and returns to step 1010.

Thus, again, in the backend system, or center node, a timer is introduced to control the frequency to read the telemetry data. The timer will trigger to track the states of receive queue. If there are receive work request states that indicate there is telemetry data written to the telemetry data buffer, the collector will read the content from the telemetry data buffer. Then, the system will check the usage of the telemetry data buffer and if it reaches the high threshold, which means too much telemetry data has been written to the telemetry data buffer, the timer is adjusted to increase the frequency of reading from the telemetry data buffer. If the usage reaches the low threshold, which means too little telemetry data has been written to the telemetry data buffer, the timer is adjusted to lower frequency of reading from the telemetry data buffer. After adjusting timer, if the timer is too large, which means the frequency is very low, then the number of receive work requests should be reduced. If the timer is too small, which means the frequency is very high, then the number of receive work requests should be increased by adding more work requests to the receive request pool. The system will post the receive work request to the receive queue. After these operations, the system will wait for the timer to trigger next read operation.

Figure 11:
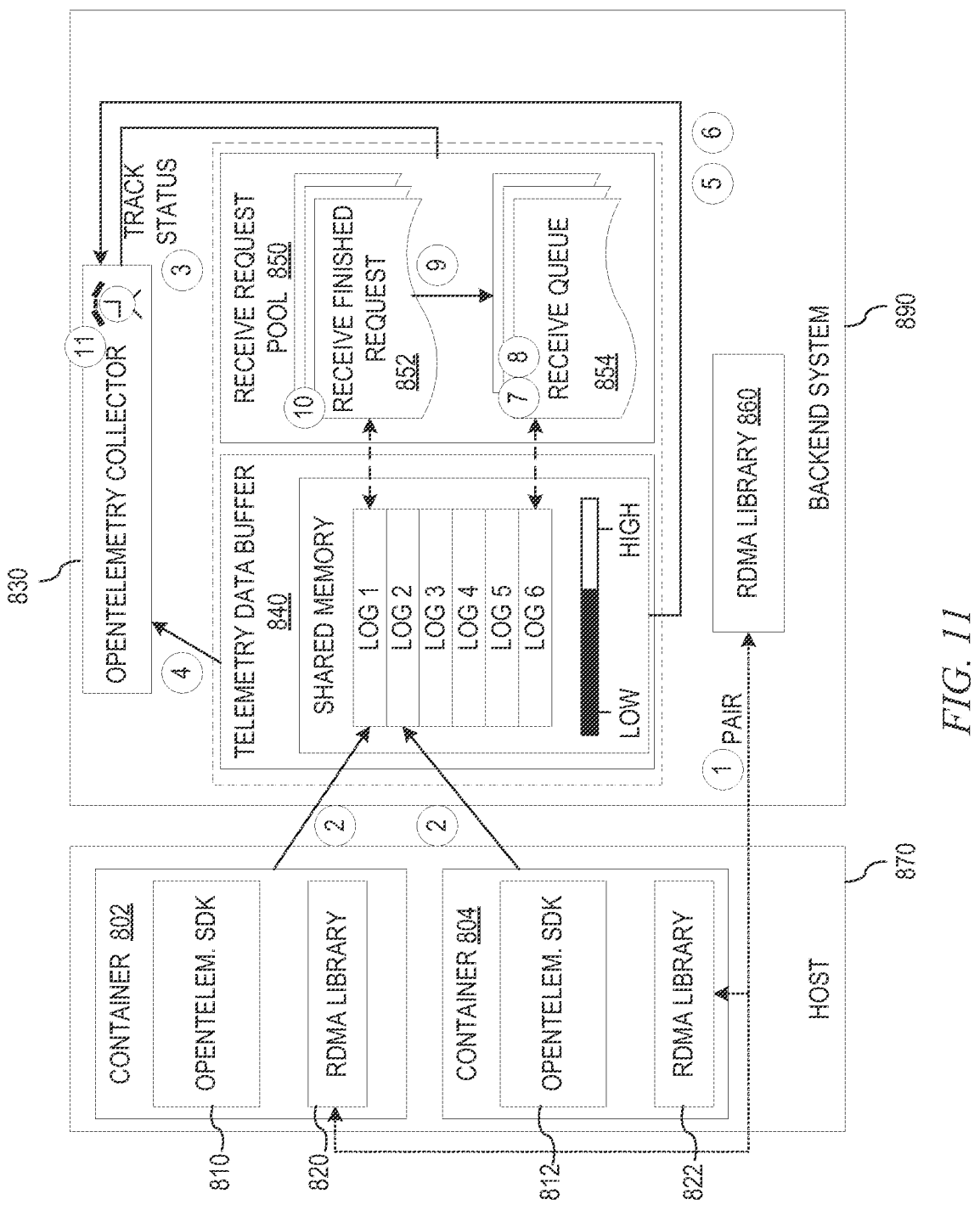
FIG. 11 is an example block diagram illustrating the operations of the workflows of FIGS. 9 and 10 with regard to elements of a host node in accordance with one illustrative embodiment.

FIG. 11 is an example block diagram illustrating the operations of the workflows of FIGS. 9 and 10 with regard to elements of a host node in accordance with one illustrative embodiment. As shown in FIG. 11, the RDMA environment is setup by creating RDMA queues in the RDMA software libraries 820, 822 and pairing them with the RDMA software library 860 queues of the backend (operation 1; operation numbers are noted in the flowcharts of FIGS. 5 and 6 for correlation purposes). The telemetry data is collected and written to the telemetry data buffer 840 using RDMA write operations (operation 2). The status of the receive queue is checked at the backend (operation 3) and the content of the telemetry data buffer records/logs are read (operation 4). The timer is evaluated to determine if it has reached the low/high thresholds and the timer is adjusted accordingly (operations 5 and 6). The timer is further evaluated to determine if it is too small/large and work requests are added/removed accordingly (operations 7 and 8). Receive work requests to the read finished buffer are put back into the receive request pool (operation 10) and the receive work requests are posted from the receive request pool (operation 9).

It should be appreciated that the operational components shown in the various figures may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings and the resulting output may aid human beings. The invention is specifically directed to the automatically operating computer components directed to improving the way that communication of telemetry data between observability tools and backend systems is performed, and providing a specific solution that implements a telemetry data buffer, Agent, and/or RDMA mechanisms that operate to eliminate the overhead associated with socket-based communications. Such a solution is specific to computer technology and cannot be practically performed by human beings as a mental process or as an organization of human activity.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, in a data processing system, for collecting telemetry data from an observability tool of a container executing on a host computing system, the computer-implemented method comprising:

configuring a shared memory to implement a telemetry data buffer, wherein the telemetry data buffer is shared by observability tool instances of a plurality of containers on one or more host computing systems, the plurality of containers comprises the container, and the one or more host computing systems comprise the host computing system;

collecting, by at least one observability tool instance of the observability tool instances, the telemetry data from a corresponding container in the plurality of containers;

attempting to obtain a lock on the telemetry data buffer;

in a case where the lock is obtained on the telemetry data buffer:

writing the collected telemetry data to a next entry in the telemetry data buffer to which the collected telemetry data is writable; and accessing, by a backend computing system, records in the telemetry data buffer to apply analytics to the collected telemetry data; and in a case where the lock is not obtained, sending the collected telemetry data to the backend computing system via a socket based communication.

2. The computer-implemented method of claim 1, wherein the accessing of the records in the telemetry data buffer comprises:

retrieving, by an Agent executing on a corresponding host computing system of the one or more host computing systems, the records from the telemetry data buffer; and sending the retrieved records to the backend computing system.

3. The computer-implemented method of claim 1, wherein the accessing of the records in the telemetry data buffer comprises reading the records from the telemetry data buffer using receive work queues of a remote data memory access environment.

4. The computer-implemented method of claim 1, wherein the writing of the collected telemetry data to the next entry in the telemetry data buffer comprises:

configuring the observability tool instances to write the collected telemetry data to the telemetry data buffer directly; and configuring an Agent executing on the same host computing system, of the one or more host computing systems, as the observability tool instances to read the records from the telemetry data buffer.

5. The computer-implemented method of claim 1, wherein the writing of the collected telemetry data to the next entry in the telemetry data buffer comprises configuring remote direct memory access (RDMA) software libraries associated with the observability tool instances to write the collected telemetry data to the telemetry data buffer using RDMA write operations, and the telemetry data buffer is present on the backend computing system.

6. The computer-implemented method of claim 1, further comprising:

setting a timer based on an amount of the collected telemetry data present in the telemetry data buffer to adjust a frequency of reading the collected telemetry data from the telemetry data buffer, wherein the accessing of the records in the telemetry data buffer comprises performing a read operation each time the timer expires.

7. The computer-implemented method of claim 6, wherein the timer is set to a relatively longer period of time based on the amount of the collected telemetry data reaching or falling below a low threshold, and the timer is set to a relatively shorter period of time based on the amount of the collected telemetry data reaching or exceeding a high threshold.

8. The computer-implemented method of claim 6, further comprising modifying a number of work requests available in a receive request pool based on the setting of the timer.

9. The computer-implemented method of claim 1, wherein the at least one observability tool instance is an OpenTelemetry Software Development Kit instance.

10. A computer program product comprising a computer readable storage medium having a computer readable program stored therein, wherein the computer readable program, when executed on a computing device, causes the computing device to collect telemetry data from an observability tool of a container executing on a host computing system, at least by:

configuring a shared memory to implement a telemetry data buffer, wherein the telemetry data buffer is shared by observability tool instances of a plurality of containers on one or more host computing systems, the plurality of containers comprises the container, and the one or more host computing systems comprise the host computing system;

collecting, by at least one observability tool instance of the observability tool instances, the telemetry data from a corresponding container in the plurality of containers;

attempting to obtain a lock on the telemetry data buffer;

in a case where the lock is obtained on the telemetry data buffer:

writing the collected telemetry data to a next entry in the telemetry data buffer to which the collected telemetry data is writable; and accessing, by a backend computing system, records in the telemetry data buffer to apply analytics to the collected telemetry data; and in a case where the lock is not obtained, sending the collected telemetry data to the backend computing system via a socket based communication.

11. The computer program product of claim 10, wherein the accessing of the records in the telemetry data buffer comprises:

retrieving, by an Agent executing on a corresponding host computing system of the one or more host computing systems, the records from the telemetry data buffer; and sending the retrieved records to the backend computing system.

12. The computer program product of claim 10, wherein the accessing of the records in the telemetry data buffer comprises reading the records from the telemetry data buffer using receive work queues of a remote data memory access environment.

13. The computer program product of claim 10, wherein the writing of the collected telemetry data to the next entry in the telemetry data buffer comprises:

configuring the observability tool instances to write the collected telemetry data to the telemetry data buffer directly; and configuring an Agent executing on the same host computing system, of the one or more host computing systems, as the observability tool instances to read the records from the telemetry data buffer.

14. The computer program product of claim 10, wherein the writing of the collected telemetry data to the next entry in the telemetry data buffer comprises configuring remote direct memory access (RDMA) software libraries associated with the observability tool instances to write the collected telemetry data to the telemetry data buffer using RDMA write operations, and the telemetry data buffer is present on the backend computing system.

15. The computer program product of claim 10, wherein the computer program product further causes the computing device to:

set a timer based on an amount of the collected telemetry data present in the telemetry data buffer to adjust a frequency of reading the collected telemetry data from the telemetry data buffer, wherein the accessing of the records in the telemetry data buffer comprises performing a read operation each time the timer expires.

16. The computer program product of claim 15, wherein the timer is set to a relatively longer period of time based on the amount of the collected telemetry data reaching or falling below a low threshold, and the timer is set to a relatively shorter period of time based on the amount of the collected telemetry data reaching or exceeding a high threshold.

17. The computer program product of claim 15, further comprising modifying a number of work requests available in a receive request pool based on the set timer.

18. An apparatus, comprising:

at least one processor; and at least one memory coupled to the at least one processor, wherein the at least one memory comprises instructions which, when executed by the at least one processor, cause the at least one processor to collect telemetry data from an observability tool of a container executing on a host computing system, at least by:

configuring a shared memory to implement a telemetry data buffer, wherein the telemetry data buffer is shared by observability tool instances of a plurality of containers on one or more host computing systems, the plurality of containers comprises the container, and the one or more host computing systems comprise the host computing system;

collecting, by at least one observability tool instance of the observability tool instances, the telemetry data from a corresponding container in the plurality of containers;

attempting to obtain a lock on the telemetry data buffer:

in a case where the lock is obtained on the telemetry data buffer:

writing the collected telemetry data to a next entry in the telemetry data buffer to which the collected telemetry data is writable; and accessing, by a backend computing system, records in the telemetry data buffer to apply analytics to the collected telemetry data; and in a case where the lock is not obtained, sending the collected telemetry data to the backend computing system via a socket based communication.

\* \* \* \* \*